W. P. JAMES.
PROTRACTOR LEVEL.
APPLICATION FILED MAY 3, 1910.
970,714.
Patented Sept. 20, 1910.
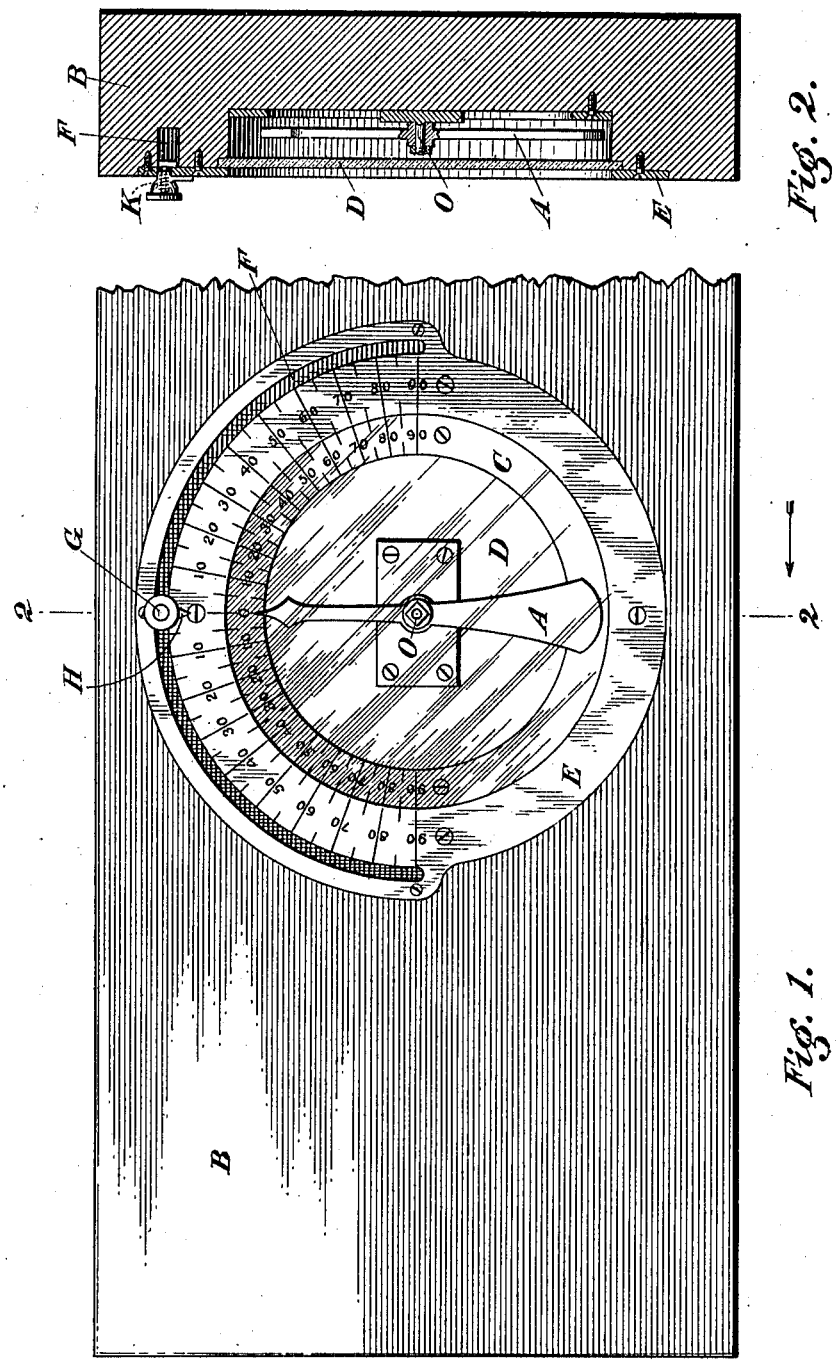

UNITED STATES PATENT OFFICE.

WILLIAM PERRY JAMES, OF LOS ANGELES, CALIFORNIA.

PROTRACTOR-LEVEL.

970,714.  Specification of Letters Patent.  Patented Sept. 20, 1910.

Application filed May 3, 1910. Serial No. 559,235.

*To all whom it may concern:*

Be it known that I, WILLIAM PERRY JAMES, a citizen of the United States, residing at No. 1131 Magnolia avenue, in the city of Los Angeles, county of Los Angeles, State of California, have invented a new and useful Protractor-Level, of which the following is a specification.

My invention relates to an instrument to be used in ascertaining levels, verticals and angles, of flat, upright or slanting surfaces; and its object is to afford an easy and simple method of determining such angles, verticals, and levels or horizontals, and to register the same.

Figure 1 represents the entire instrument as viewed from its face. The mechanism of the instrument is set in a block of wood or metal, having straight parallel edges and square corners, similar to the block commonly used to set spirit levels in. The block may be of any convenient length and thickness. Fig. 2 represents a cross-section of the instrument, showing the several parts in position as viewed when thus exposed.

In Fig. 1, A is a metal arrow indicator, swung on a pivot O, about which it may revolve completely. This indicator is set in a depression or recess cut into the side of the block B, approximately three-fourths of an inch in depth. The indicator A is cut wider from the pivot toward the reverse end than it is from the pivot toward its point, so that the weight of that portion of said indicator from the pivot to the reverse end will be at least twice the weight of that portion thereof from the pivot to the point of said indicator. When mounted in place, and when the block is held in position to take an angle or level, the indicator by gravity will always point upward, or at an angle of 90° with the plane of the earth's surface.

At the bottom of the circular depression cut into block B, in which the indicator is mounted, and around the circumference of said circular depression, is placed a strip of brass or other metal approximately one-third of an inch in width, C. The pivot O of the indicator A is set exactly in the center of the circle formed by the strip of metal C. At the point where the point of the indicator A rests when the longest edges of the block B are held exactly parallel with the plane of the earth's surface, the metal strip C is marked with a zero (0). From this point and on either side of it are laid off on the brass or metal strip C the degrees of a quarter circle, the scale reading from the zero mark to ninety degrees on either side of the zero mark. As the arrow indicator A swings upon its pivot it will then indicate the angle at which the instrument is held. Over the central depression cut into the block hereinbefore referred to as containing indicator A, is placed a glass cover D, and over this cover a second brass or metal ring in the form of a circle E. Ring E fits flush with the surface of the block B, and is concentric with the inner circular strip C. Upon this latter strip E are laid off figures indicating the degrees of quarter circles, so placed that said markings will form continuations of the similar marks on the inner circle C, drawn as radii from the common center O. In a slot F, cut in the outer edge of strip E, and also into the block B, is placed a metal knob G which is attached to a pivot and held in place on the under side by a small helical spring K. A small tongue H is attached to the indicator knob G, and points toward the degree marks upon strip E. The indicator knob G can be moved to any point along the slot F and will be held at any point where left by the helical spring.

I claim:

A leveling device comprising a frame of suitable material, having straight and parallel side edges, a gravity indicator mounted thereon, the frame being provided with a dial in the form of a circle laid off in degrees from zero to 90 degrees on each side of a central zero, the indicator coöperating with the dial to indicate the angle at which the frame is held, the frame being provided with an arcuate slot, concentric with the circle of the dial, and a spring-held pointer arranged in said slot and movable along the latter all substantially as and for the purpose set forth.

WILLIAM PERRY JAMES.

Witnesses:
N. H. PETERSON,
A. J. WHEELER.